United States Patent
Baumann

(10) Patent No.: US 10,946,693 B2
(45) Date of Patent: Mar. 16, 2021

(54) FASTENING ARRANGEMENT FOR A RIM OF A WHEEL

(71) Applicant: Dr. Ing. h.c. F. Porsche Aktiengesellschaft, Stuttgart (DE)

(72) Inventor: Hans-Uwe Baumann, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 333 days.

(21) Appl. No.: 16/160,271

(22) Filed: Oct. 15, 2018

(65) Prior Publication Data

US 2019/0111729 A1    Apr. 18, 2019

(30) Foreign Application Priority Data

Oct. 18, 2017 (DE) .......................... 102017124318.6

(51) Int. Cl.
| | |
|---|---|
| *B60B 3/14* | (2006.01) |
| *F16B 39/02* | (2006.01) |
| *B60B 3/16* | (2006.01) |
| *B60B 3/18* | (2006.01) |
| *F16B 39/12* | (2006.01) |

(52) U.S. Cl.
CPC .............. *B60B 3/142* (2013.01); *B60B 3/165* (2013.01); *B60B 3/18* (2013.01); *F16B 39/02* (2013.01); *F16B 39/12* (2013.01)

(58) Field of Classification Search
CPC .. B60B 3/14; B60B 3/142; B60B 3/18; B60B 3/165; F16B 39/02; F16B 39/12; F16B 41/005
See application file for complete search history.

(56) References Cited

U.S. PATENT DOCUMENTS

| | | | | |
|---|---|---|---|---|
| 6,106,076 | A | * | 8/2000 | Gandellini .............. B60B 3/142 301/35.55 |
| 7,841,251 | B2 | * | 11/2010 | Bogue ................. F16H 25/2003 74/89.42 |
| 7,922,258 | B2 | | 4/2011 | Baumann |
| 9,320,962 | B2 | * | 4/2016 | Krell ......................... B60B 3/18 |
| 2006/0145531 | A1 | * | 7/2006 | Galvanin ............ B60B 27/0026 301/111.04 |

(Continued)

FOREIGN PATENT DOCUMENTS

| | | | | |
|---|---|---|---|---|
| DE | 10207815 | B4 | * 7/2004 | ............. B60B 3/142 |
| DE | 202005020504 | U1 | * 2/2006 | ............... B60B 7/20 |

(Continued)

*Primary Examiner* — Jason R Bellinger
*Assistant Examiner* — Emily G Castonguay
(74) *Attorney, Agent, or Firm* — RatnerPrestia

(57) ABSTRACT

A fastening arrangement for a rim of a wheel on a wheel hub of a wheel carrier of a motor vehicle. The fastening arrangement includes a central screw which, on a fastening portion, has an external thread which engages in an internal thread of a step of the wheel hub. A tensioner produces a force-fitting connection between the wheel hub step and the central screw. A locking arrangement prevents unintentional release of the central screw. The locking arrangement has a carrier member and a blocking member, wherein the blocking member is pretensioned in relation to the carrier member by a locking spring member and is displaceable in the axial direction. The blocking member is arranged captively in the carrier member by a securing mechanism.

10 Claims, 3 Drawing Sheets

(56) References Cited

U.S. PATENT DOCUMENTS

2013/0020855 A1 * 1/2013 Becker .................... B60B 3/165
                                                          301/35.63

FOREIGN PATENT DOCUMENTS

| DE | 102007061258 A1 |   | 6/2009 |     |           |
|----|-----------------|---|--------|-----|-----------|
| DE | 102013002443 A1 | * | 8/2014 | ... | B60B 3/142 |
| EP | 2100750 A1      | * | 9/2009 | ... | B60B 3/14 |

* cited by examiner

FASTENING ARRANGEMENT FOR A RIM OF A WHEEL

CROSS-REFERENCE TO RELATED APPLICATION

This application claims priority to German Patent Application No. DE 10 2017 124 318.6, filed Oct. 18, 2017, which is incorporated by reference herein in its entirety.

FIELD OF THE INVENTION

The invention relates to a fastening arrangement for a rim of a wheel on a wheel hub of a wheel carrier of a motor vehicle, comprising a central screw which, on a fastening portion, has an external thread which engages in an internal thread of a step of the wheel hub, wherein a tensioning means is provided which produces a force-fitting connection between the wheel hub step and the central screw, wherein a locking arrangement is provided which, in a closure position, prevents unintentional release of the central screw, wherein the locking arrangement has a carrier member and a blocking member, wherein the blocking member is pretensioned in relation to the carrier member by a locking spring member and is displaceable in the axial direction.

BACKGROUND OF THE INVENTION

Fastening arrangements of this type for a rim are well known from the prior art. They have in particular a central nut which is intended to prevent unintentional release, for example, of the rim which is connected to the wheel hub by further screws. Furthermore, a fastening arrangement of this type can serve as anti-theft protection.

A fastening arrangement of the type in question is known from DE 10 2007 061 258 A1, which is incorporated by reference herein in its entirety. A first disadvantage of such a fastening arrangement is that a certain rotational play has to be provided in order to avoid tilting of toothing arrangements. Furthermore, the locking arrangement has to be fitted in individual parts, which makes the installation difficult and may lead to parts becoming lost during transportation or prior to the installation.

SUMMARY OF THE INVENTION

It is desirable to avoid the disadvantages of the fastening arrangement of the type in question in a simple and cost-effective manner.

To avoid the disadvantages, a blocking member is arranged captively in a carrier member via securing means. It is thereby ensured that at least the locking arrangement can be preassembled as a preassembly part in order then to be fitted together with the central screw in the final installation process. In an advantageous embodiment, the securing means consist of a securing step on the blocking member and a securing stop on the carrier member, which prevent the blocking member from dropping out on that side of the carrier member which is directed toward the central screw in the finally fitted state.

Owing to the fact that the tensioning means is in the form of a slotted cone which is connected to the central screw via a first securing member which is designed in particular as a securing spring and engages in groove members of the cone and of the central screw, a force fit can be produced in a simple manner.

The opposite side can be secured here in an advantageous manner by the fact that the locking spring member is supported on a closure disk which is arranged captively in the carrier member via a second securing member which is designed in particular as a securing spring and engages in groove members of the closure disk and of the carrier member.

In a particularly advantageous embodiment, the carrier member is arranged captively in the central screw via a third securing member which is designed in particular as an omega spring and engages in groove members of the carrier member and of the central screw. By this means, it is possible to preassemble the central screw with the locking arrangement in such a manner that individual parts cannot be lost, and the central screw together with the locking arrangement can be simply and completely fitted during the final installation.

In an advantageous manner, the blocking member in the closure position is in engagement with the central screw via a first toothing arrangement on the side facing away from the carrier member. In order to avoid tilting during release or closure of the fastening arrangement without having to provide an available rotational play, the blocking member has at least one clamping member which is mounted in a groove member of the blocking member in a spring-loaded manner so as to be movable in the transverse direction with respect to the longitudinal axis of the blocking member, wherein the clamping member is of wedge-shaped design and has a clamping edge such that, in the closure position, said clamping member interacts with a locking toothing of the carrier member in such a manner that, in a first direction of rotation, said clamping member lies against the locking toothing and, in the second direction of rotation, said clamping member permits freewheeling of the blocking member in relation to the carrier member. By this means, a particularly simple change from a closure position into a release position and vice-versa is ensured.

The clamping member can be spring-loaded by a leaf spring which is supported on an inner wall surface of the carrier member. It is also possible that the clamping member is spring-loaded by a spiral spring which is supported in a holding-down device, wherein the holding-down device has a partially circular outer surface which is supported on an inner wall surface of the carrier member.

In an advantageous manner, the carrier member is in engagement at the end facing away from the central screw with the wheel hub step via a second toothing arrangement, as a result of which the carrier member can be supported on the wheel hub step and, in the first direction of rotation of the clamping member of the locking arrangement, a rotational coupling is produced between the carrier member and the central screw.

BRIEF DESCRIPTION OF THE DRAWINGS

The invention is explained in more detail with reference to a drawing, in which.

DETAILED DESCRIPTION OF THE INVENTION

Figure 1:
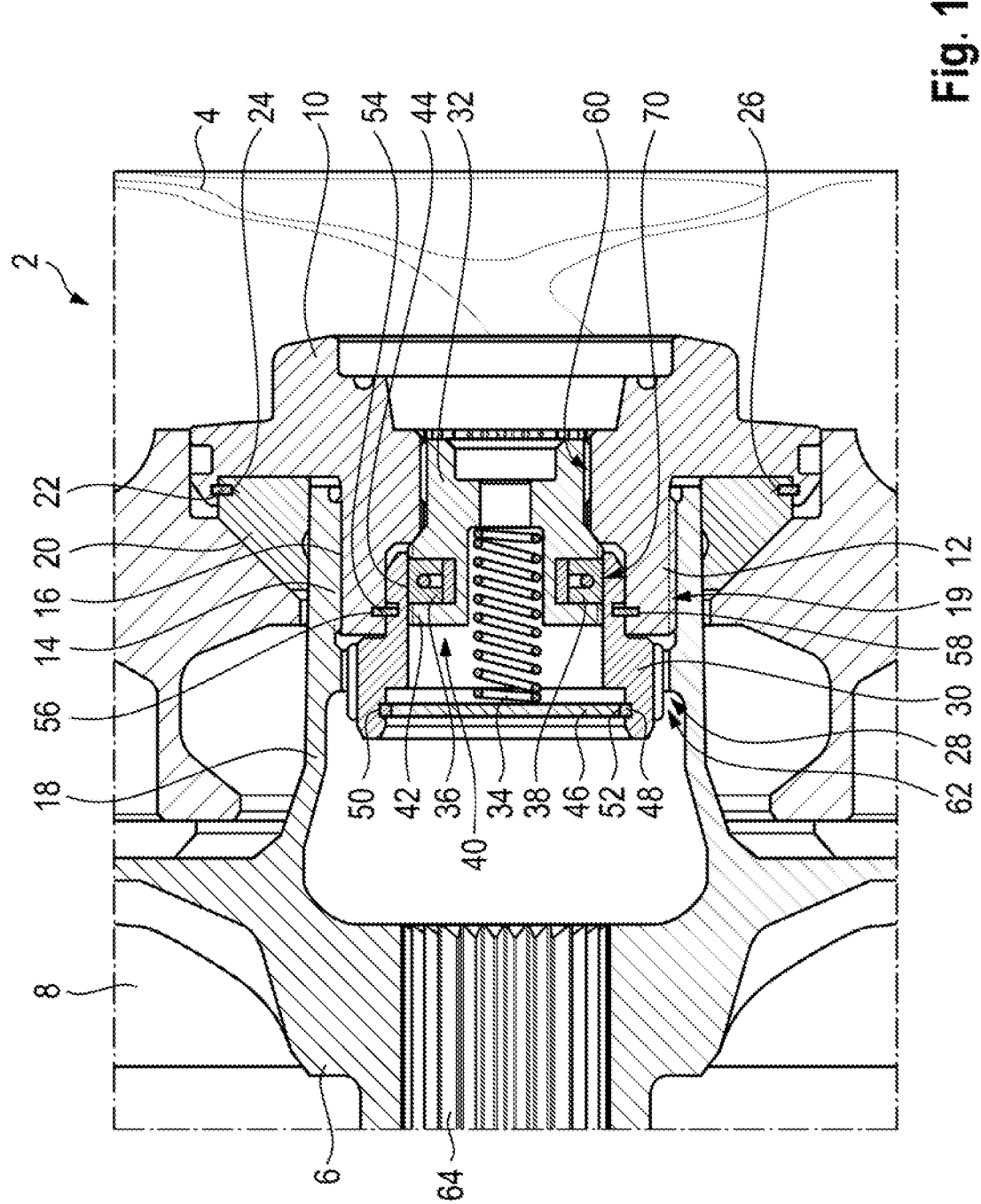
FIG. 1 shows a sectional view of the fastening arrangement according to aspects of the invention in a closure position.

FIG. 1 shows a sectional view of a fastening arrangement 2 according to aspects of the invention with which a rim 4 of a wheel (not illustrated further) is fastened captively to a wheel hub 6 of a wheel carrier 8.

For this purpose, the fastening arrangement 2 has a central screw 10 which, on a fastening portion 12, has an external thread 14 which engages in a corresponding internal thread 16 of a step 18 of the wheel hub 6 in order to fasten the rim 4 centrally to the wheel hub 6. A threaded connection 19 which is thereby produced is loaded in a force-fitting manner by a tensioning means 20 which basically produces a force-fitting connection between wheel hub step 18 and the central screw 10 in the installed state. The tensioning means 20 can be designed here in the form of a cone which is slotted per se and is connected to the central screw 10 via a first securing member 22 which is designed in particular as a securing spring and engages in groove members 24 of the central screw 10 and 26 of the cone 20.

In order now to prevent an unintentional release of the fastening arrangement 2, a locking arrangement 28 is provided. In the view shown, said locking arrangement 28 is illustrated in a closure position. The locking arrangement 28 substantially comprises a carrier member 30 and a blocking member 32 which, in the installed state, are pretensioned against each other by a locking spring member 34. As explained in more detail below under FIG. 3, the blocking member 32 is displaceable here in the axial direction in relation to the carrier member 30 in order to release the fastening arrangement 2. In the present exemplary embodiment, two clamping members 36, 38, which are explained in more detail in conjunction with FIG. 2, are provided in order to pass from the closure position into the release position and vice-versa in a simple manner.

In order to ensure that the blocking member 32 can be captive in the carrier member 30, securing means 40 are provided on that side of the locking arrangement 28 which faces the wheel hub 6. Said securing means 40 consist of a securing step 42 on the blocking member 32 and a securing stop 44 on the carrier member 30, which ensure that the blocking member 32 cannot be pushed out of the carrier member in the direction of the central screw 10. On the opposite side of the carrier member 30, the locking spring member 34 is supported on a closure disk 46 which, for its part, is arranged captively in the carrier member 30 via a second securing member 48. For this purpose, the securing spring 48 engages in groove members 50, 52 of the carrier member 30 and of the closure disk 46. In the present exemplary embodiment, the locking arrangement 28 is furthermore also arranged captively in the central screw 10. This is ensured by a third securing member 54 which is designed as an omega spring. For this purpose, said omega spring 54 engages in groove members 56 of the central screw 10 and 58 of the carrier member 30. This creates a fastening arrangement 2 which has an integrated locking arrangement 28 connected captively thereto. In order, in the closure position, to ensure a rotational coupling of the wheel hub 6, the central screw 10 and the locking arrangement 28, a first toothing arrangement 60 is provided which, in the closure position, brings the blocking member 32 on the side facing away from the carrier member 30 into engagement with the central screw 10. Said toothing arrangement 60 is designed as a spur toothing 78. Furthermore, for the rotational coupling, a second toothing arrangement 62 is provided which brings the carrier member 30 at the end facing away from the central screw 10 into engagement with the wheel hub step 18. Said second toothing arrangement 62 is also designed as a spur toothing.

It should also be noted that reference sign 64 indicates part of a further spur toothing which serves to bring the wheel hub 6 into engagement with an axle shaft (not illustrated further) of a motor vehicle.

Figure 2:
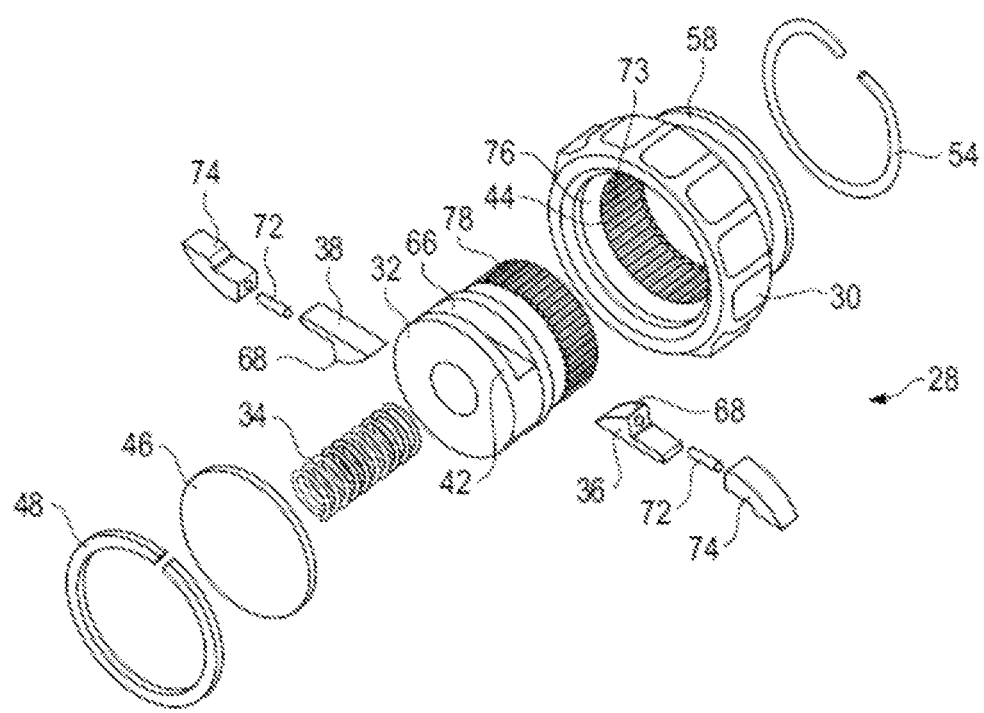
FIG. 2 shows an exploded view of a locking arrangement of the fastening arrangement from FIG. 1.

FIG. 2 shows the locking arrangement 28 in a perspective exploded view. The explanation with regard to FIG. 2 can also be used as the installation sequence. First of all, the two clamping members 36, 38 are inserted into the groove members 66 provided in each case for them. The respective clamping member 36, 38 is of wedge-shaped design such that, in the closure position, said clamping member can be in engagement with a clamping edge 68 in a locking toothing 73 of the carrier member 30 (see FIG. 1 for this purpose). The respective clamping member 36, 38 is supported here on a sliding surface 76 of the carrier member 30 in a spring-loaded manner via a spiral spring 72 and a holding-down device 74 which has a partially circular outer surface. The blocking member 32 which is preassembled in such a manner can then be inserted into the carrier member 30 and enters with the securing step 42 into contact with a toothing edge of the securing stop 44. The locking spring member 34 and the closure disk 46 are then subsequently inserted and secured in the carrier member 30 by the securing spring 48, as a result of which the blocking member 32 is placed under pretension. The omega spring 54 can then already be provided in the corresponding groove member 58 on the carrier member 30 in order to be arranged captively in the central screw 10 in the final installation. As an alternative to the holding-down device 74, use can also be made of a leaf spring, as a result of which a component, namely the spiral spring 72, can be saved. It should be clear that, instead of two clamping members 36, 38, use can also be made merely of one clamping member or else of three clamping members or more.

Figure 3:
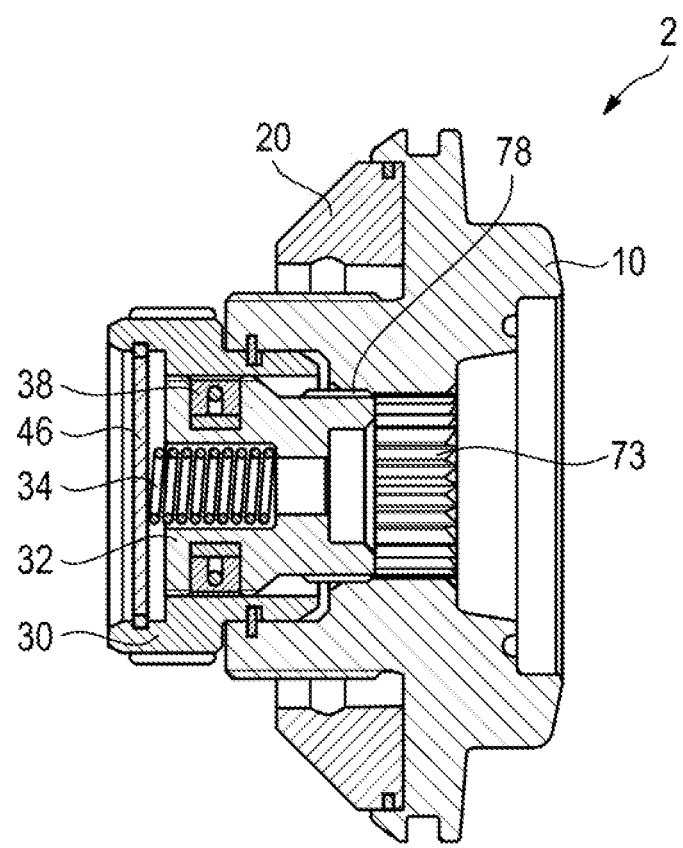
FIG. 3 shows a detailed view of the fastening arrangement in the released state.

FIG. 3 now shows the fastening arrangement 2 according to aspects of the invention in the release position. For the sake of clarity, not all of the reference signs from FIG. 1 have been carried over. In order to transfer the fastening arrangement 2 from a closed position into a release position, the blocking member 32 is pressed in the direction of the closure disk 46 counter to the pretensioning of the locking spring member 34 by means of a corresponding installation tool (not illustrated), as a result of which the locking toothing 70 is released and corresponding toothing members 73 are no longer in engagement and therefore the blocking member 32 no longer blocks a rotation of the central screw 10 in the opening direction. During the release of the central screw 10, the carrier member 30 remains in position via the second toothing arrangement 62. The blocking member 32 still remains here in the toothing of the central screw 10 even in the open position. Carrier member 30 and blocking member 32 are rotated with respect to each other. The clamping members 36, 38 are located here in the untoothed plane of the sliding surface 76 of the carrier member 30. In other words, a relative movement of carrier member 30 and blocking member 32 leads to the engagement between the clamping members 36, 38 and the toothing members 73 being released, as a result of which the clamping members 36, 38 are moved into the untoothed plane of the sliding surface 76 of the carrier member 30.

What is claimed is:

1. A fastening arrangement for a wheel on a wheel hub of a wheel carrier of a motor vehicle, the fastening arrangement comprising:
    a central screw which, on a fastening portion, has an external thread which engages in an internal thread of a step of the wheel hub, a tensioning means which produces a force-fitting connection between the wheel hub step, the wheel and the central screw, a locking arrangement which, in a closure position, prevents unintentional release of the central screw, wherein the locking arrangement has a carrier member and a blocking member, wherein the blocking member is pretensioned in relation to the carrier member by a locking spring member and is displaceable in an axial direction, wherein the blocking member is arranged captively in the carrier member by a securing means, wherein a relative movement of the carrier member and the blocking member has the effect that an engagement of clamping members with toothing members of the carrier member is released, and in that the clamping members can be brought into an untoothed plane of a sliding surface of the carrier member.

2. The fastening arrangement as claimed in claim 1, wherein the securing means comprises a securing step on the blocking member and a securing stop on the carrier member.

3. The fastening arrangement as claimed in claim 1, wherein the tensioning means is a slotted cone which is connected to the central screw by a first securing member, which is a securing spring, and engages in groove members of the central screw and of the cone.

4. The fastening arrangement as claimed in claim 1, wherein the locking spring member is supported on a closure disk which is arranged captively in the carrier member by a second securing member, which is a securing spring, and engages in groove members of the closure disk and of the carrier member.

5. The fastening arrangement as claimed in claim 1, wherein the carrier member is arranged captively in the central screw by a third securing member which is a spring and engages in groove members of the carrier member and of the central screw.

6. The fastening arrangement as claimed in claim 1, wherein the blocking member is in engagement with the central screw in an axially displaceable manner by a first toothing arrangement on a side facing away from the carrier member.

7. The fastening arrangement as claimed in claim 1, wherein the blocking member has at least one of the clamping members which is mounted in a groove member of the blocking member in a spring-loaded manner so as to be movable in a transverse direction with respect to a longitudinal axis of the blocking member, wherein said one of the clamping members has a wedge-shaped design and a clamping edge such that, in the closure position, said clamping member interacts with a locking toothing of the carrier member in such a manner that, in a first direction of rotation, said clamping member lies against the locking toothing and, in a second direction of rotation, said clamping member permits freewheeling of the blocking member in relation to the carrier member.

8. The fastening arrangement as claimed in claim 7, wherein, in an opening position, the clamping members are freely rotatable together with the blocking member on the untoothed plane of the sliding surface in the carrier member.

9. The fastening arrangement as claimed in claim 7, wherein the clamping member is spring-loaded by a spiral spring which is supported in a holding-down device, wherein the holding-down device has a partially circular outer surface which is supported on an inner wall surface of the carrier member.

10. The fastening arrangement as claimed in claim 1, wherein the carrier member is in engagement at an end facing away from the central screw with the wheel hub step by a second toothing arrangement.

* * * * *